(12) United States Patent
Pan

(10) Patent No.: US 6,525,550 B2
(45) Date of Patent: Feb. 25, 2003

(54) METHOD AND APPARATUS FOR TEMPERATURE CONTROL

(75) Inventor: Qi Pan, Didcot (GB)

(73) Assignee: Bookham Technology PLC, Abingdon (GB)

( * ) Notice: Subject to any disclaimer, the term of this patent is extended or adjusted under 35 U.S.C. 154(b) by 10 days.

(21) Appl. No.: 09/727,854

(22) Filed: Dec. 1, 2000

(65) Prior Publication Data

US 2002/0030499 A1 Mar. 14, 2002

(30) Foreign Application Priority Data

Sep. 11, 2000 (GB) .............................................. 0022231

(51) Int. Cl.[7] .......................... G01R 27/08; G01R 27/26; G05D 23/00
(52) U.S. Cl. ......................... 324/721; 324/760; 324/685; 165/290; 236/78 B
(58) Field of Search ................................. 324/721, 224, 324/760, 685; 250/238; 95/87; 165/290, 288, 293, 289; 236/78 B, 78 D

(56) References Cited

U.S. PATENT DOCUMENTS

| | | | | |
|---|---|---|---|---|
| 3,817,453 A | | 6/1974 | Pinckaers ................. 236/68 C |
| 4,005,002 A | * | 1/1977 | Racine et al. ................ 219/513 |
| 4,349,726 A | | 9/1982 | Gossler ....................... 219/511 |
| 4,741,476 A | | 5/1988 | Russo et al. ............... 236/46 R |
| 4,849,637 A | * | 7/1989 | Cerff et al. .................. 250/345 |
| 5,199,637 A | | 4/1993 | Adams ....................... 236/78 R |
| 5,654,654 A | * | 8/1997 | Franklin ...................... 327/103 |
| 5,954,860 A | * | 9/1999 | Gordon .......................... 95/87 |
| 6,326,610 B1 | * | 12/2001 | Muramatsu .................. 250/238 |
| 6,184,504 B1 | * | 2/2002 | Cardella ...................... 219/513 |

FOREIGN PATENT DOCUMENTS

JP 6-308557 * 11/1994 ................. 324/721

* cited by examiner

Primary Examiner—Christine Oda
Assistant Examiner—Anjan K. Deb
(74) Attorney, Agent, or Firm—Fulbright & Jaworski L.L.P.

(57) ABSTRACT

A two-stage circuit configured to control the temperature of a device, having: a first stage connected to the device for controlling the temperature of the device; and a second stage having a temperature sensor and a heat source associated with the first stage for controlling the temperature of the first stage. An apparatus and method for controlling the temperature of an optical, electrical, or electronic device, or other analogous device provides a greater degree of control, i.e. control within a narrower band than is currently possible, by utilising a second stage of control associated with the first stage of control.

38 Claims, 3 Drawing Sheets

METHOD AND APPARATUS FOR TEMPERATURE CONTROL

FIELD OF THE INVENTION

This invention relates to the control of temperature. More specifically, this invention relates to the control of the temperature of electrical, electronic or optical devices in order to provide high levels of stability to those devices.

BACKGROUND AND SUMMARY OF THE INVENTION

Optical devices and analogous electrical and electronic devices often require to be operated under very stable temperature conditions. The temperature of operation is usually set to be a little higher than the ambient temperature. For example, the operating temperature may be 75° C. for a device operating in an external environment which temperature ranges from 0° C. to 70° C.

Often, the temperature of such a device must be controlled to remain within ±0.2° C. of the required temperature of operation (i.e. 75° C.), and preferably within ±0.1° C. In addition to this, the temperature control must be able to accommodate wide and rapid external fluctuations within the ambient temperature range. Furthermore, a temperature controller provided to control such a device may be subject to the same, or a similar, ambient temperature as the device requiring control.

At present, the control of the temperature of a device, for the sake of example, an optical device, is achievable within a range of approximately ±°C. of the temperature required for the correct operation of the device. Such a degree of control is acceptable for a device comprising optical waveguides formed in silica ($SiO_2$) on a substrate of silicon (Si), for example.

However, the above degree of control is insufficient for the control of the temperature of optical devices comprising optical waveguides formed in silicon. If such a degree of control is utilised, the temperature will deviate too far from the ideal operating temperature of the device, and degradation in the performance of the device will ensue. There is thus a problem in the provision of a sufficient degree of control for optical devices utilising silicon waveguides and the like, and analogous electrical and electronic systems which require a similarly stable operating temperature.

With the foregoing in mind, the present invention aims to provide a greater degree of temperature control than is currently available utilising prior art temperature control circuitry and apparatus.

In accordance with the present invention there is provided a two-stage circuit configured to control the temperature of a device, comprising:

a first stage connected to the device for controlling the temperature of the device; and a second stage comprising a temperature sensor and a heat source and/or a cooler associated with the first stage for controlling the temperature of the first stage.

The use of two stages of temperature control provides significant advantages over the prior art use of a single stage of control. The main advantage is that, by controlling the temperature of a first stage of control utilising a second stage of control, that first stage of control is able to provide an increased degree of control over the device to which the overall temperature controller is applied.

In accordance with a preferred embodiment of the present invention a heat source and temperature sensor associated with the first temperature control stage are packaged with the device which temperature is to be controlled, thereby enabling the control of the device temperature by the first temperature controller.

In accordance with a preferred embodiment of the present invention, the heat source and temperature sensor associated with the second stage temperature control circuit are packaged with the first stage temperature control circuit, thereby enabling control of the temperature of the first stage temperature control circuit.

Preferably, the first stage temperature control circuit is packaged with the device which temperature is to be controlled. This enables the provision of a more compact piece of apparatus. However, it is foreseen that the first temperature control circuit may be provided packaged separately from the device which temperature is to be controlled.

In accordance with a further preferred embodiment of the present invention, the circuit further comprises a power amplifier connected to the output of each temperature control circuit.

Preferably, each heat sensor is one of a thermistor or a resistive temperature detector (RTD).

Preferably the temperature control circuit comprises a reference voltage generator, a voltage divider, a balancing arrangement, and an amplifier circuit, and is configured to balance a sensor temperature with a required temperature. More preferably, the voltage divider is connected to the reference voltage generator thereby providing a trimming facility to tune the balance of the circuit. Still more preferably, the power amplifier provides, from the balance signal output by the temperature control circuit, a current to drive the source of heat associated with the temperature control circuit connected to the power amplifier.

Also in accordance with the present invention there is provided a method of controlling the temperature of a device which temperature requires strict control in a predetermined temperature range, comprising:

utilising a second temperature control circuit to control the temperature of a first temperature control circuit to be within a first range; and utilising the first temperature control circuit to control the temperature of the device to be within a second range.

Preferably, the first range is about ±1° C. around a desired temperature.

Preferably the second range is about ±0 2° C. around a desired temperature. More preferably, the second range is about ±0 1° C. around a desired temperature.

DETAILED DESCRIPTION OF A PREFERRED EMBODIMENT OF THE INVENTION

A specific embodiment of the present invention is now described, by way of example only, with reference to the accompanying drawings.

Figure 1:
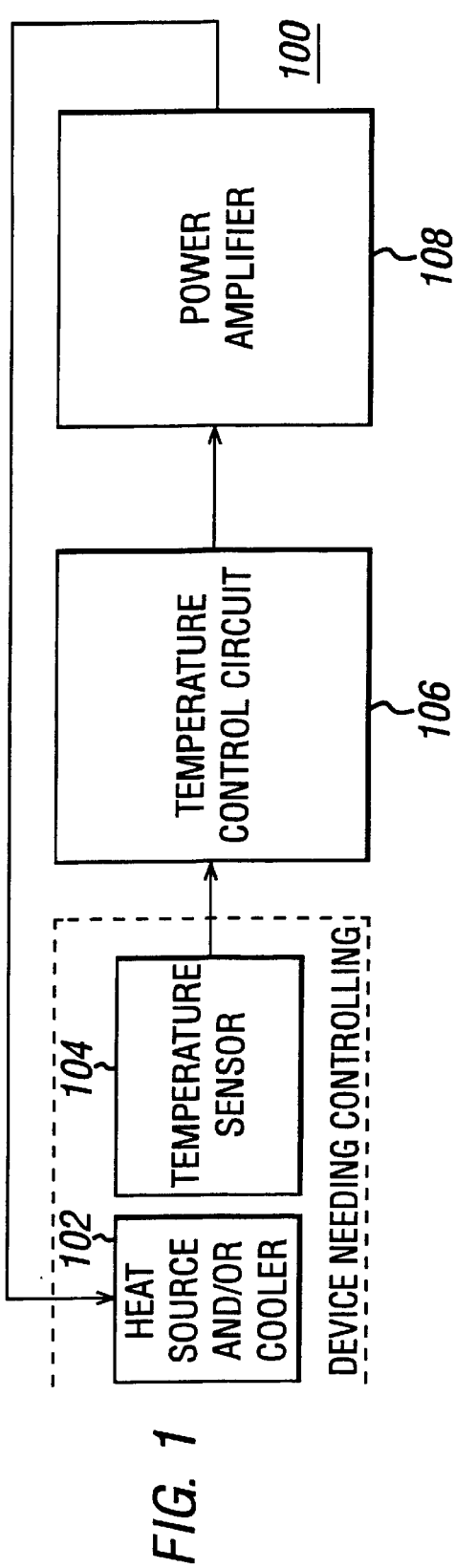
FIG. 1 is a block diagram illustrating a stage of a temperature controller according to the present invention.
Figure 2:
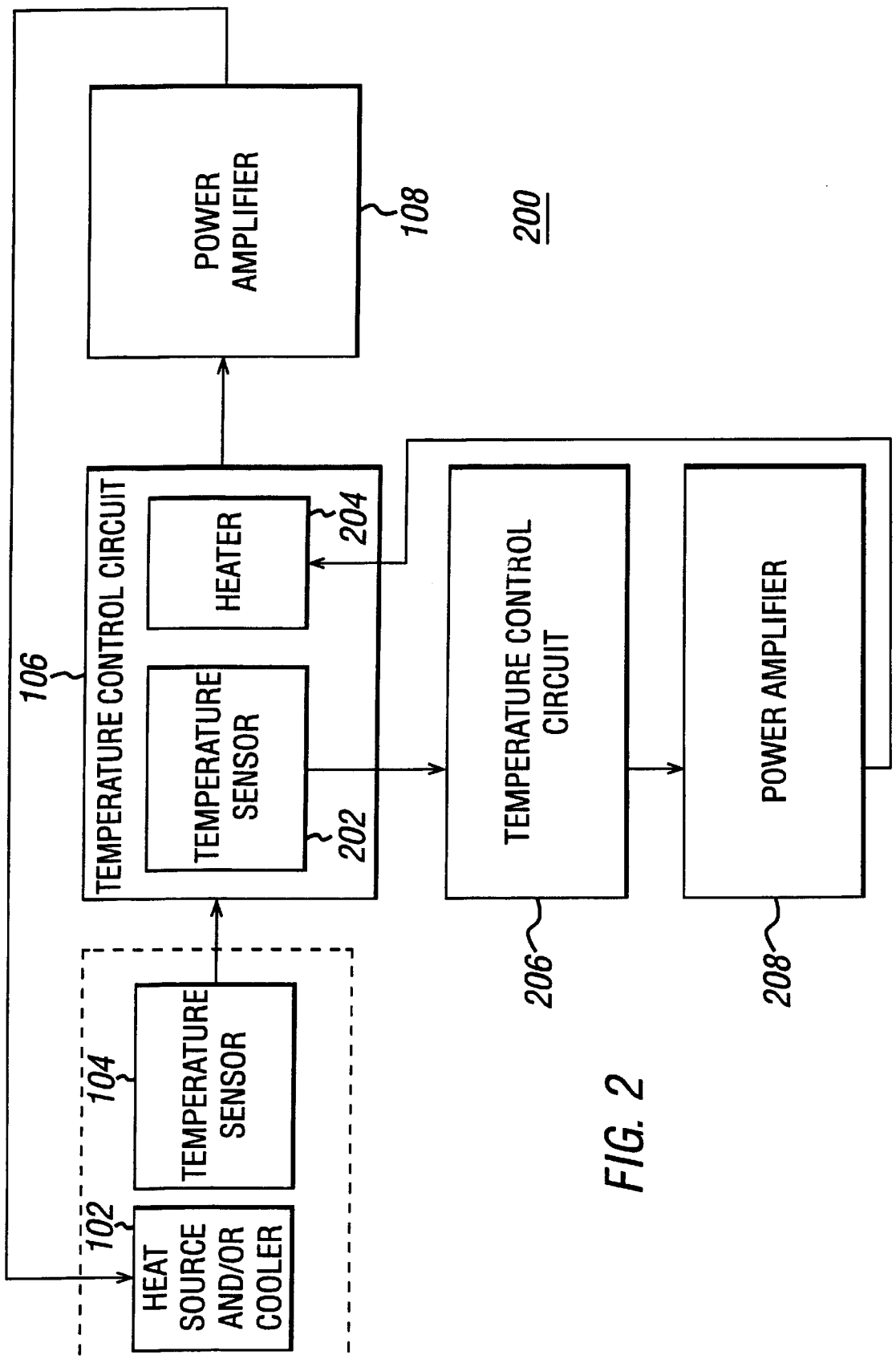
FIG. 2 is a block diagram illustrating one embodiment of a temperature controller according to the present invention.

With reference to FIGS. 1 and 2 of the accompanying drawings, a temperature controller according to the present invention comprises a number of stages 100. As may be seen, each stage comprises certain elements. These elements "are a heat source (or heater) and/or cooler 102, a temperature sensor 104, such as a thermistor or a resistive temperature detector (RTD), a temperature control circuit 106 and a power amplifier 108. The temperature sensor 104 is located within the package of a device which requires control of its temperature and is connected directly to the temperature control circuit 106, such that the temperature control circuit 106 receives the output of the temperature sensor 104. Additionally, the temperature control circuit 106 may be thermally isolated from the device within which it may be packaged.

The power amplifier 108 is connected to, so as to receive the output of, the temperature control circuit 106. The power amplifier generates therefrom a current which drives the heat source and/or cooler 102, thereby determining the temperature of the device under control. As such, the entire controller stage, as seen in FIG. 1, reacts to fluctuations in the device temperature and counteracts them by the provision or reduction of current flow to the heat source and/or cooler 102. In the event that a heat source and cooler are presenting the circuitry provided would drive either the heat source or the refrigeration unit in order to adjust the temperature of the device being controlled, as required. This is so whether the heat source and cooler/refrigeration unit are stand alone devices or are comprised within a single unit such as a Thermo Electric Cooler.

FIG. 2 illustrates a complete temperature controller 200 according to the present invention. As will be appreciated, the temperature controller incorporates two stages (cf. 100, FIG. 1). A first stage of the temperature controller is configured as described with reference to FIG. 1, i.e. with its heat source and temperature sensor packaged with the device which temperature requires control.

However, the second stage is configured to control the temperature of the temperature control circuit 106 of the first stage. Accordingly, a temperature sensor 202 and a heat source 204, associated with the second stage of control, are packaged with the control circuit 106 of the first stage of control. The temperature sensor 202 is connected to a second stage temperature control circuit 206, which is connected to a second stage power amplifier 208. As before, the temperature sensor 202 provides an output, in this case representative of the ambient temperature around the control circuit 106, to the temperature control circuit 206, which generates an output indicative of what action is required in order to balance the sensed temperature and the required temperature for the first stage of control. This signal is converted into a driving current by the power amplifier 208, which drives the heat source 204 in order to correct or maintain the temperature.

The purpose of utilising a second stage of control is now described. As has already been set out, some optical devices, for example devices utilising optical waveguides formed in silicon or arrayed waveguide gratings in multiplexers and demultiplexers for dense wavelength division multiplexing (DWDM), and analogous electrical and electronic devices are very sensitive to the temperature at which they operate. Thus, the temperature of these devices is controlled. However, due to various reasons, including the effects of fluctuation of their ambient and operating temperatures, the temperature controllers currently available are only effective to within ±1° C. of the desired temperature. The use of a second stage of control, to control the temperature of the first stage of control, will thus remove or reduce the variation in performance of the elements within the first stage control circuit. This will provide a first stage of control which produces greater performance and accuracy and therefore greater control over the device ultimately under control.

Accordingly, the second stage of control within the temperature controller 200 controls the temperature of the temperature control circuit 106 within the first stage of control 100 to within approximately ±1° C. of the desired temperature for operation. Utilising a previous example, to within 75±1° C. This provides a more certain and higher performance first stage of control. Thus, the first stage of control 100 is able to control the device requiring control to within approximately ±0.1° C., e.g. 75±0.1° C. Such a range is not currently achievable utilising prior art systems.

The temperature control circuit 106 of the first stage of control 100 may or may not be packaged with the device which it is to control. Similarly, it may or may not be thermally isolated from that device. This is also true for the second stage temperature controller 206. However, an advantageous embodiment of the present invention will be described below with reference to FIG. 3.

Figure 3:
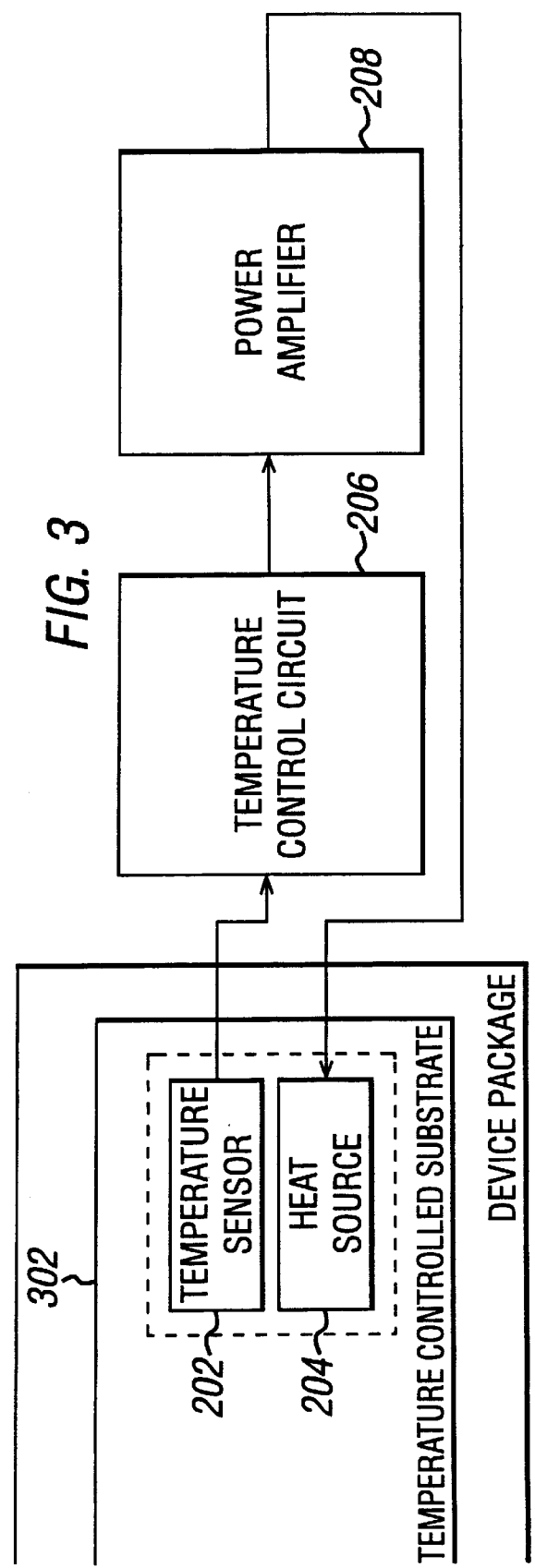
FIG. 3 is a block diagram illustrating a further embodiment of a temperature controller according to present invention.

FIG. 3 depicts an embodiment of the present invention in which the first stage temperature control circuit includes a heatable substrate 302 of the device requiring temperature control. This obviously only applies to devices which comprise such a heatable substrate. In this embodiment, the first stage control is achieved by the control of the device, such as an optical unit comprising a heatable substrate for supplying heat to the layers or layer formed thereon, through the heatable substrate.

As may be seen, the second stage of control 200 is provided as already described. A temperature sensor 202 and heat source 204 are provided upon the substrate and are connected to a temperature control circuit 206 and a power amplifier 208, respectively, which are also connected. The operation of this embodiment is as before. However, the second stage of control provides tight control of the temperature of the heatable substrate 302, which then provides the temperature control for the device in which it is located.

A specific realisation of the first stage of control 100 of the present invention will now be described with reference to FIG. 4. The elements set out in FIG. 4 may also be utilised in the provision of a second stage of control according to the present invention. However, this will not necessarily be the case.

Figure 4:
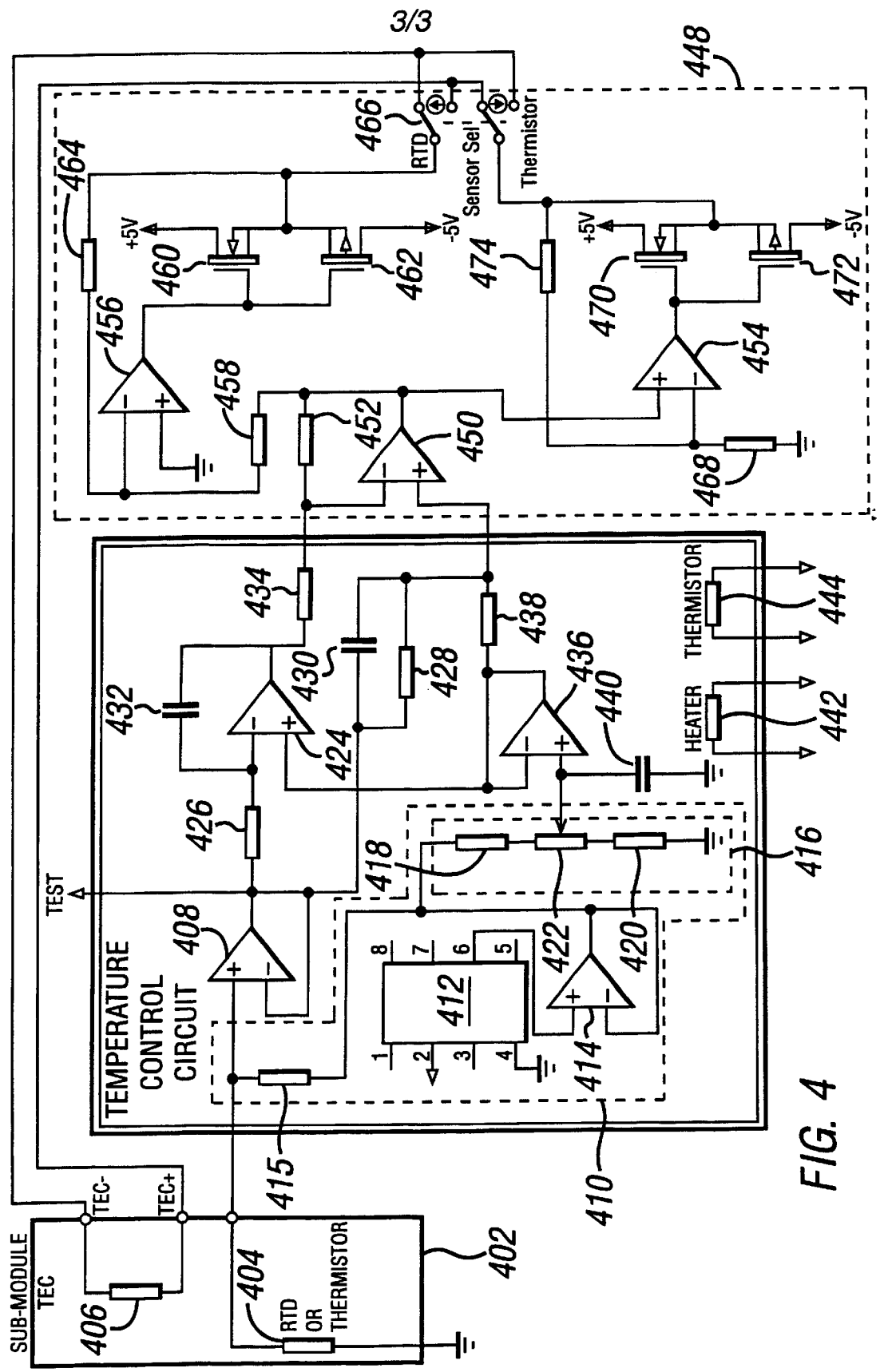
FIG. 4 is a circuit diagram illustrating one realisation of the block diagram of FIG. 1.

As may be seen in FIG. 4, a sub module 402 comprising a temperature sensor 404 in the form of a resistive temperature detector (RTD) and a heat source and/or cooler 406 in the form of a Thermo Electric Cooler (TEC) is configured to be located or packaged within a device requiring temperature control. The temperature sensor is connected between ground and a temperature control circuit by way of the positive input of a first operational amplifier 408. The output of the temperature sensor is combined, for input to the positive input of the first operational amplifier 408, with the output of a reference module 410. All operational amplifiers in FIG. 4 are connected to ±5 v supply rails, and may be LMC64841M operational amplifiers produced by National Semiconductor.

The reference circuit 410 comprises an integrated circuit (IC) 412 which may be a MAX6190 produced by Maxim Integrated Products, Inc. As is seen, the IC 412 is connected between ground and the ±5 v supply rail. The IC 412 is a temperature variable element, and produces a reference voltage that varies with the temperature of the circuit with which it is packaged. Therefore, control of the temperature of the first stage provides control of the variation of the reference voltage produced in the first stage. Similarly, control of the variations of output or value, etc. of all the resistors and integrated circuits in the first stage, is provided. This, in turn, provides more stable control of the device being controlled. The output of the IC 412 is connected to a voltage follower, i.e. to the positive input of a second operational amplifier 414 which output is connected to its own negative input. The output of the second operational amplifier 414 is also connected to the positive input of the first operational amplifier 408, via a resistor 415, which may have a value of approximately 1.2 kΩ, after being combined with the output of a variable voltage divider 416.

The variable voltage divider comprises two fixed resistances 418, 420 of approximately 5.1 kΩ and a variable resistance 422 connected in series therebetween. The series combination of resistances 418, 422, 420 is connected between the output of the voltage follower and ground respectively. The variable resistance 422 allows the reference voltage applied to the first operational amplifier 408 to be trimmed in order to fine tune the circuit.

Returning now to the first operational amplifier 408, the output thereof is connected directly to the negative input thereof, to the negative input of a third operational amplifier 424 via a serially connected resistance 426, which may be of approximately 100 kΩ and also is connected to an output of the temperature control circuit, when merged with another signal as will be described below, via a parallel resistance/capacitance combination consisting of a resistance 428, which may be of approximately 47 kΩ, connected in parallel with a capacitor 430, which may be of approximately 2 μF or simply via the resistance 428 in which case the capacitance 430 will not be present within the circuit. It should be noted that the values for the resistance 428 and the capacitor 430 may vary from those expressed.

Considering again the third operational amplifier 424, the output thereof is fed back to the negative input thereof, via a serially connected capacitance 432. The capacitance 432 may be of approximately 22 μF. Additionally, the output is connected to a resistance 434, which may be of approximately 20 kΩ, the output of which forms a second output of the temperature control circuit.

The positive input of the third operational amplifier 424 is connected to the negative input of a fourth operational amplifier 436, the output of which is fed back to the negative input thereof and, at the same time, is connected via a resistance 438, which may be of approximately 47 kΩ, to the first output of the temperature controller. At this stage it merges with the processed output of the first operational amplifier 408. The positive input of the fourth operational amplifier 436 is connected to the moveable contact of the variable resistance 422, and to ground via a capacitance 440, which may be of approximately 100 nF.

The temperature control circuit also incorporates a heat source 442 and a temperature sensor 444, in the form of a thermistor, which are associated with a second stage of control.

The temperature control circuit utilises the reference voltage produced by the IC 412 and trimmed by the voltage divider 416 to balance the positive inputs to the first and third operational amplifiers 408, 424. Making these two input values the same automatically compensates for variations from the required device temperature detected by the temperature sensor 404. This is achieved by producing a balance signal that will drive the heat source and or cooler 406 as necessary to compensate for said variations. This is continued until the sensed temperature equals the required temperature, i.e. they are balanced.

The two outputs of the temperature control circuit are connected to a power amplifier module 448. In this regard, the first output is connected to the positive input of a fifth operational amplifier 450 and the second output is connected to the negative input of the fifth operational amplifier 450. The output of the fifth operational amplifier is fed back to the negative input thereof, via a resistance 452, which may be of approximately 68 kΩ. In addition, the output from the fifth operational amplifier 450 is connected to the positive input of a sixth operational amplifier 454, and to the negative input of a seventh operational amplifier 456, via a resistance 458, which may be of approximately 10 kΩ.

As may be seen, the positive input of the seventh operational amplifier is connected to ground, and the output thereof is connected to a parallel arrangement of two depletion or enhancement mode metal oxide semiconductor field effect transistors (DE MOSFETS), 460 and 462. The output of the seventh operational amplifier 456 is connected to the gate of each MOSFET, and the source of each MOSFET is connected. The drain of the first DE MOSFET 460 is connected to the ±5 v supply rail and that of the second DE MOSFET 462 is connected to the −5 v supply rail. The combined sources are additionally connected, via a resistance 464 which may be of approximately 130 kΩ, to the negative input of the seventh operational amplifier 456. Further, the combined sources are connected to a sensor select switch 466 which is set according to the type of temperature sensor being utilised (in this embodiment an RTD). The switch 466 also dictates the mode of connection of the power amplifier to the heat source 406, as may be seen. As a TEC is used, the switch 466 provides the correct direction of current flow for the required output from the TEC, i.e., when the device is hot, current is caused to flow in such a direction as to cause the TEC to cool the device in which it is located. It will be appreciated that, in the situation wherein only one sensor or sensor type is utilised within the sub-module, the switch 466 will be unnecessary and will have not be present.

Returning to the sixth operational amplifier 454, the negative input thereof is connected to ground, via a resistance 468 which may be of approximately 10 kΩ. The output of the amplifier is connected to a parallel arrangement of two DE MOSFETS 470, 472 identical to that described above. The combined sources of these two MOSFETS are fed back, via a resistance 474 which may be approximately 120 kΩ, to the negative input of the sixth operational amplifier 454 and to the switch 466. The DE MOSFETS utilised may be MTD20P06HDL and/or MTD20N06HDL MOSFETS produced by Motorola.

Depending upon the sensor selected, the power amplifier receives the voltage output by the temperature control circuit and generates therefrom a current of up to approximately 3 to 4 amperes (A). This current is provided to the heat source and/or cooler 406 causing the provision of heat to the device. Thus, the temperature sensor monitors the temperature and variations therein are automatically compensated for by the production of an appropriately sized current supplied to the heat source. The heat source thereby produces an appropriate amount of heat to compensate for the variation (i.e. the drop) in temperature sensed by the sensor.

It will be appreciated that, although this invention has been described with reference to a particular configuration of temperature control circuit, power amplifier, temperature sensor and heat source and/or cooler, other configurations, such as all elements being packaged together or packaged in specific combinations, are within the scope of this invention as defined by the claims.

Additionally, although this invention has been described generally with reference to the provision of heat to a device in order to control its temperature, it applies equally to the removal of heat, i.e. cooling. For example, if a device requires to be controlled to operate at a temperature of below 0° C. and the ambient temperature ranges from 0° C. to 30° C., a heat exchanger may be provided in the place of the heat source described. The heat exchanger may be triggered to remove heat from the device by the provision of a current configured to restore a balance of a sensed temperature and a required temperature. Of course, both the provision of and removal of heat may be provided for by the inclusion, within the system, of a device such as a Thermo Electric Heater (TEC)

It will of course be understood that this invention has been described above by way of example only, and that modifications of detail can be made within the scope of this invention.

What is claimed is:

1. A two-stage circuit configured to control a temperature of a device, comprising:
    a first stage connected to a device, the first stage including a temperature control circuit, a first temperature sensor, and a first heat source for controlling the temperature of the device; and
    a second stage comprising a second temperature sensor and a second heat source for controlling a temperature of the first stage temperature control circuit.

2. The circuit of claim 1 wherein said first temperature sensor and a cooler are packaged with the device which temperature is to be controlled, thereby enabling control of the device temperature by the first stage.

3. The circuit of claim 2 wherein the second temperature sensor and another cooler are packaged with the first stage, thereby enabling control of a temperature of the first stage.

4. The circuit of claim 3 wherein the first stage is packaged with the device which temperature is to be controlled.

5. The circuit of claim 1 wherein the second temperature sensor and the second heat source are packaged with the first stage, thereby enabling control of a temperature of the first stage.

6. The circuit of claim 3 wherein the first stage is packaged with the device which temperature is to be controlled.

7. The circuit of claim 1 further comprising a power amplifier connected to an output of the temperature control circuit.

8. The circuit of claim 1 wherein the second temperature sensor is one of the list of:
    thermistor; and
    resistive temperature detector (RTD).

9. The circuit of claim 2 wherein the second temperature sensor is one of the list of:
    thermistor; and
    resistive temperature detector (RTD).

10. The circuit of claim 1 wherein the first stage comprises a reference voltage generator, a voltage divider, a balancing arrangement, and an amplifier sub-circuit, and is configured to balance a required temperature and a sensed temperature.

11. The circuit of claim 10 wherein the voltage divider is connected to the reference voltage generator thereby providing a trimming facility to tune the balance of the circuit.

12. The circuit of claim 1 wherein the second stage comprises a reference voltage generator, a voltage divider, a balancing arrangement, and an amplifier sub-circuit, and is configured to balance a required temperature and a sensed temperature.

13. The circuit of claim 12 wherein the voltage divider is connected to the reference voltage generator thereby providing a trimming facility to tune the balance of the circuit.

14. The circuit of claim 1 wherein the temperature control circuit of the first stage comprises a reference voltage generator, a voltage divider, a balancing arrangement, and an amplifier sub-circuit and is configured to balance a required temperature and a sensed temperature, wherein the power amplifier sub-circuit provides from a balanced signal output, a current to drive the first heat source.

15. The circuit of claim 14 wherein the voltage divider is connected to the reference voltage generator thereby providing a trimming facility to tune the balance of the circuit.

16. The circuit of claim 15 wherein the voltage divider is connected to the reference voltage generator thereby providing a trimming facility to tune the balance of the circuit.

17. The circuit of claim 1 wherein the second stage comprises another temperature control circuit of the second stage that comprises a reference voltage generator, a voltage divider, a balancing arrangement, and an amplifier sub-circuit and is configured to balance a required temperature and a sensed temperature, wherein the power amplifier sub-circuit provides from a balanced signal output, a current to drive the second heat source.

18. The circuit of claim 1 wherein the device is an optical device.

19. The circuit of claim 18 wherein the optical device is one of the list of:
    an arrayed waveguide grating;
    a multiplexer; and
    a demultiplexer.

20. A method of controlling a temperature of a device which requires temperature control in a predetermined temperature range, comprising:
    utilizing a first temperature control stage, including a temperature control circuit, a temperature control sensor and a heat source to control a first temperature of the device to be within a first range; and
    utilizing a second temperature control stage, including a temperature sensor and a heat source to control a second temperature of the temperature control circuit of the first temperature control stage within a second range.

21. The method of claim 20 wherein the second range is bounded by a desired temperature minus one degree Celsius and the desired temperature plus one degree Celsius.

22. The method of claim 21 wherein the desired temperature is approximately 75 degrees Celsius.

23. The method of claim 20 wherein the first range is bounded by a desired temperature minus 0.2 degrees Celsius and the desired temperature plus 0.2 degrees Celsius.

24. The method of claim 23 wherein the desired temperature is approximately 75 degrees Celsius.

25. The method of claim 20 wherein the first range is bounded by a desired temperature minus 0.1 degrees Celsius and the desired temperature plus 0.1 degrees Celsius.

26. The method of claim 25 wherein the desired temperature is approximately 75 degrees Celsius.

27. A two-stage circuit configured to control a first temperature of a device, comprising:
    a first stage comprising a first heat transfer element that is thermally coupled to said device, a first temperature sensor for determining said first temperature of said device, and a first temperature control circuit that controls the first temperature of the device utilizing at least a signal from said first temperature sensor and said first heat transfer element; and a second stage comprising a second heat transfer element that is thermally coupled to said first temperature control circuit, a second temperature sensor for determining a second temperature of said first temperature control circuit, and a second temperature control circuit that controls said second temperature of said first temperature control circuit utilizing at least a signal from said second temperature sensor and said second heat transfer element.

28. The circuit of claim 27 wherein said second heat transfer element is operable to transfer heat to said first temperature control circuit.

29. The circuit of claim 27 wherein said second heat transfer element is operable to transfer heat from said first temperature control circuit.

30. The circuit of claim 27 wherein said first heat transfer element and said first temperature sensor are packaged within a common module with the device.

31. The circuit of claim 27 wherein said first heat transfer element is a temperature adjustable substrate.

32. The circuit of claim 27 wherein said first temperature sensor is selected from the list consisting of: a resistive temperature detector (RTD) and a thermistor.

33. A method of controlling a first temperature of a device, comprising:

transferring heat associated with said device via a first heat transfer element;

generating a first temperature signal that is representative of the first temperature by a first temperature sensor;

operating a first temperature control circuit utilizing at least said first temperature signal to drive said first heat transfer element;

transferring heat associated with said first temperature control circuit via a second heat transfer element;

generating a second temperature signal that is representative of a second temperature of said first temperature control circuit by a second temperature sensor; and operating a second temperature control circuit utilizing at least said second temperature signal to drive said second heat transfer element.

34. The method of claim 33 wherein said first heat transfer element is operable to transfer heat from said device.

35. The method of claim 33 wherein said second heat transfer element is operable to transfer heat to said device.

36. The method of claim 33 wherein said first heat transfer element and said first temperature sensor are packaged within a common module with the device.

37. The method of claim 33 wherein said first heat transfer element is a temperature adjustable substrate.

38. The method of claim 33 wherein said first temperature sensor is selected from the list consisting of: a resistive temperature detector (RTD) and a thermistor.

* * * * *